(12) United States Patent
Grandy

(10) Patent No.: X3626
(45) Date of Patent: Dec. 21, 1822

(54) SAW-SETTING

(76) Inventor: Rufus Grandy

The Schedule referred to in these Letters Patent
and making part of the same containing a description in the
words of the said Rufus Grandy himself of his improvement
in the saw set, for setting the teeth of saws.

---

Prepare, made of iron, or of any other suitable material,
a square or other convenient shaped straight bar, having one
of its extremities drawn or shaped to a tapering point, for
the purpose of receiving a handle. Let such handle be fixed
permanently upon it. Let the length of such part of the
said square, or other shaped bar, as appears or shows
itself, outside of the handle aforesaid be equal to five
or six inches more or less, as may be found most conve-
nient. The thickness of the bar aforesaid may be from
one fourth of an inch or less to half an inch, or more;
according to circumstances; a large and strong saw re-
quiring a thickness of material greater than what will be
sufficient for a small one.

Imagine, now that this square or other
shaped straight bar, as aforesaid, is laid on the table
before you, that the handle of the same points directly
towards you, and that the bar itself, of course, points
directly from you. At about two and a half inches
from the remotest extremity of the bar, but more or less
as convenience requires, let the bar aforesaid be bent
towards your left hand, for instance, (or towards your
right if you prefer it) in manner such as that the
part of the bar so bent towards your left (or to the
right as the case may be) shall make a right lined
angle with the former direction of the same part of the
said bar, equal to twenty five degrees of a circle, more
or less, as shall be found to be most convenient to the
purpose to which the said saw set is to be applied.

The bar, bent now in an angular figure, being sup-
posed to be still on the table in the situation; at about
half an inch from its farthest extremity, more or less, as
may be judged proper, let a screw, with a flat, or other
convenient shaped head, be carried through the bent part
of the said bar, in a direction parallel with the said
table, and at right angles with that part of the bar which
it penetrates. When the bar has been bent, as I have
supposed, towards our left, the head of the screw is at
our left; when the bar has been bent towards our right,
the head of the screw is at our right also. Let this
screw, from the use it performs, be called the gage-screw.
Let also, that part of the bar aforesaid, which is between
the handle and the angle formed by bending, be called, for
the sake of distinction, the straight part, and let the other
part of the same bar called, for the like reason, the
bent part. Moreover let the [illegible] hand surface of both of
the straight and the bent parts, be called the straight upright
surface and bent upright surface of those parts respectively.

Provide now a short bar of iron, or other suit-
able material of about an inch, more or less, as the case may
be, in length and of the same shape, square for instance, as
the straight bar first herein mentioned, having one of its longest
surfaces of the same width as the straight upright surface
above mentioned. Let one extremity of this short bar,
be bevilled off to an angle, much like that made by the
two sides of the tooth of a saw, in manner such that
the line constituting the edge or angle so made, shall be
parallel with the table aforesaid, or what is the same
thing, perpendicular to the aforesaid straight, upright, sur-
face. The proper place for this short bar, when all
is put together for use, is a position in which it is paral-
lel with the said straight part, so called, and parallel to such part of it, as to cause the line or edge made
by bevelling the extremity aforesaid, of the said short bar,
to a point towards the angle before mentioned as being
made by the straight part and bent part of the original
straight bar.

Between the aforesaid straight upright sur-
face, and the corresponding surface of the short bar afore-
said, there is to be interposed, a plate of an uniform thick-
ness, equal to the thickness of the saw, whose teeth it
is intended to set and of a rectangular form. The use of
this plate is two fold; 1st to make a space or chasm
between the straight upright surface and the aforesaid
short bar, large or wide enough to receive the saw teeth,
near the angle of the straight with the bent part aforesaid;
2d by being confined to a certain position, by means yet
to be described, to permit the tooth aforesaid, to be em-
braced by the chasm, space or crevice aforesaid, to
a certain, desirable depth, and no more. These it is, viz,
it will accomplish, when by any suitable means this
intervening plate, as I will name it, is made to remain
fixed and stationary, during its time of use, to the
straight part of the original bar.

Last of all, prepare what is called a sliding
collar made of any suitable material. Let its figure be
such, that if a longitudinal section of it were made, in
manner such as to exhibit a section of its cavity, the
exterior of the section would have the figure of a parallelo-
gram; the shape of a section of the cavity would also
be that of a parallelogram whose similar sides are parallel
with those of the former parallelogram. The internal dimen-
sions of this sliding collar must be such as conveniently,
to allow it to slide over and upon the straight part
the intervening plate, and the short bar aforesaid. Let this collar then, be so slided over the parts just mentioned— while the machine we are describing is lying on the table before us. The saw set is now in a condition fit for use, with the exception of a solitary screw. Enter then this screw through the right hand end of the collar, as it lays before us, and use this screw which we may call the confining screw, in such a manner as to press, when they are in their proper positions, the short bar, and the intervening plates, upon the aforesaid straight part of the bar first herein mentioned. The gauge screw being now carried or screwed into the bar as far as may be desirable, in order to bend the teeth into the requisite angle with the face of the saw; the saw set is ready for use Witnesses
Thomas Skidmore
Harris Sewell Rufus Grandy Ent
99 K.

[illegible] (Patented Dec: 21st 1822)

2—328 a.

DRAFTSMAN'S DIVISION.

*All communications should be addressed to*
"The Commissioner of Patents,
Washington, D. C."

*DEPARTMENT OF THE INTERIOR,*

United States Patent Office.

*Washington, D. C.,* ____________, *189*__

*SIR:*

*The printed* copies *of Patent No.* R Grundy Dec 21, 1822 are *exhausted.*

*As soon as reprinted a copy will be mailed you to complete your order.*

*By direction of the Commissioner:*

*Very respectfully,*

____________

*Chief Clerk.*

3148b6-97-5m